(12) United States Patent
Kline et al.

(10) Patent No.: US 9,996,679 B2
(45) Date of Patent: Jun. 12, 2018

(54) METHODS AND APPARATUS FOR DEVICE AUTHENTICATION AND SECURE DATA EXCHANGE BETWEEN A SERVER APPLICATION AND A DEVICE

(71) Applicant: Pegasus Media Security, LLC, Reston, VA (US)

(72) Inventors: Paul Kline, Washington, DC (US); David Weinstein, Arlington, VA (US); Allan Weinstein, Potomac, MD (US); Changsheng Yang, Reston, VA (US)

(73) Assignee: Pegasus Media Security, LLC, Reston, VA (US)

( * ) Notice: Subject to any disclaimer, the term of this patent is extended or adjusted under 35 U.S.C. 154(b) by 0 days. days.

(21) Appl. No.: 15/586,004

(22) Filed: May 3, 2017

(65) Prior Publication Data

US 2017/0323087 A1 Nov. 9, 2017

Related U.S. Application Data

(60) Provisional application No. 62/331,223, filed on May 3, 2016.

(51) Int. Cl.
| | |
|---|---|
| *H04L 9/32* | (2006.01) |
| *G06F 21/10* | (2013.01) |
| *H04L 9/08* | (2006.01) |
| *H04L 29/06* | (2006.01) |

(52) U.S. Cl.
CPC ............ *G06F 21/10* (2013.01); *H04L 9/0869* (2013.01); *H04L 63/0428* (2013.01); *H04L 2209/603* (2013.01)

(58) Field of Classification Search
None
See application file for complete search history.

(56) References Cited

U.S. PATENT DOCUMENTS

| | | | |
|---|---|---|---|
| 2012/0023568 A1* | 1/2012 | Cha .................. | G06F 21/335 726/10 |
| 2012/0042363 A1* | 2/2012 | Moosavi ............ | H04L 9/3228 726/5 |
| 2012/0072979 A1 | 3/2012 | Cha et al. | |
| 2015/0089624 A1* | 3/2015 | Kim .................. | G06F 21/44 726/9 |

OTHER PUBLICATIONS

International Search Report and Written Opinion issued by the International Searching Authority for Application No. PCT/US17/30866, dated Aug. 11, 2017, 7 pages.

* cited by examiner

*Primary Examiner* — Brandon S Hoffman
(74) *Attorney, Agent, or Firm* — Cooley LLP

(57) ABSTRACT

In some embodiments, a method includes sending an authentication request to a client device to obtain a utilization code in response to a request from the client device to access data. The utilization code is uniquely associated with the client device. The method includes obtaining an authentication response including the utilization code from the client device and authenticating the client device if the utilization code matches a utilization identifier stored in a database. The method includes generating an encryption key using a seed based at least in part on the utilization code and encrypting the data with the encryption key to generate encrypted data and sending, when the utilization code matches the utilization identifier stored in the database, the encrypted data to the client device without requiring a user of the client device to login.

22 Claims, 3 Drawing Sheets

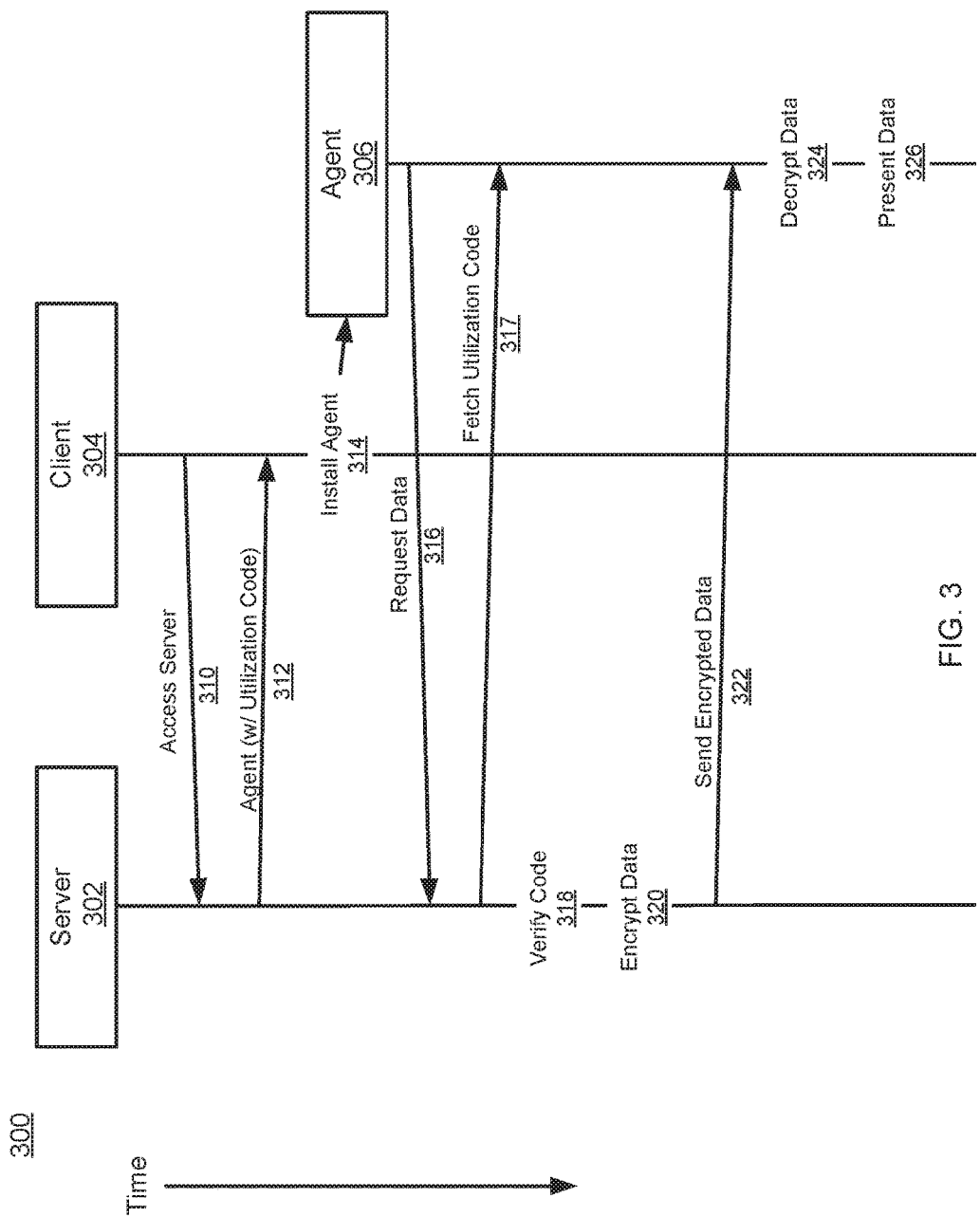

METHODS AND APPARATUS FOR DEVICE AUTHENTICATION AND SECURE DATA EXCHANGE BETWEEN A SERVER APPLICATION AND A DEVICE

CROSS-REFERENCE TO RELATED APPLICATIONS

This application claims priority to and the benefit of U.S. Provisional Patent Application No. 62/331,223, filed May 3, 2016, and titled "Methods and Apparatus for Device Authentication and Secure Data Exchange Between a Server Application and a Device," which is incorporated herein by reference in its entirety.

BACKGROUND

Some embodiments described herein relate generally to cybersecurity, authentication, and digital rights management (DRM), and, in particular, to methods and apparatus for device authentication and secure data exchange between a server application and a device.

Server applications, including websites, web applications, social media websites, video-sharing websites, and streaming services, regularly provide access to copyrighted or proprietary data to the public and/or non-authenticated users. Owners of the server applications and the rights holder of the data often seek to prevent piracy or digital theft of the copyrighted data. Providing copyrighted data to users, however, can impose risks to the rights of the data holders. For example, the copyrighted data can sometimes be easily copied and/or pirated when sent to unauthenticated devices.

Accordingly, a need exists for methods and apparatus for authenticating the devices from which users receive data provided by the server application without requiring the users to log-in. Moreover, a need exists for methods and apparatus for protecting data while the data is sent from a server through network to a client device.

SUMMARY

In one embodiment, for example, a user accesses a site or an app (e.g., client application) served by a server application for the first time from a particular client device. The client device downloads a client installation package or a software agent from the server. Included in the software agent or the client installation package installed on the client device is a utilization code, which is a unique identifier for the client device. Each time a user accesses the server application from the device, the server application uses the utilization code to identify and authenticate the client device. Because the utilization code is provided by the server application and therefore known and/or stored by the server application, the server application (or a proxy of the server application, for example a web service) is able to identify and authenticate the device or the software agent provided by the server application and installed on the device, without requiring the user to login to the site or app served by the server application. Once the server application authenticates via the utilization code a client device or the software agent provided by the server application and installed on said client device, the server application determines that the client device or software agent is permitted to receive data served from the server application. When a user returns again to the site or app provided by the server application at a later date, the server application can attempt to obtain from the client device the utilization code for the client device or the utilization code for the software agent installed on the client device. Because the utilization code is a unique identifier for a specific device, or a unique identifier for the device on which the software agent is installed, the device or the software agent will fail authentication if the utilization code obtained by the server application from the client device or software agent does not match the utilization code known and/or stored by the server application.

BRIEF DESCRIPTION OF THE DRAWINGS

FIG. 3 is a logical representation of data exchange between a server, a client device, and an agent on the client device, according to an embodiment.

DETAILED DESCRIPTION

Figure 1:
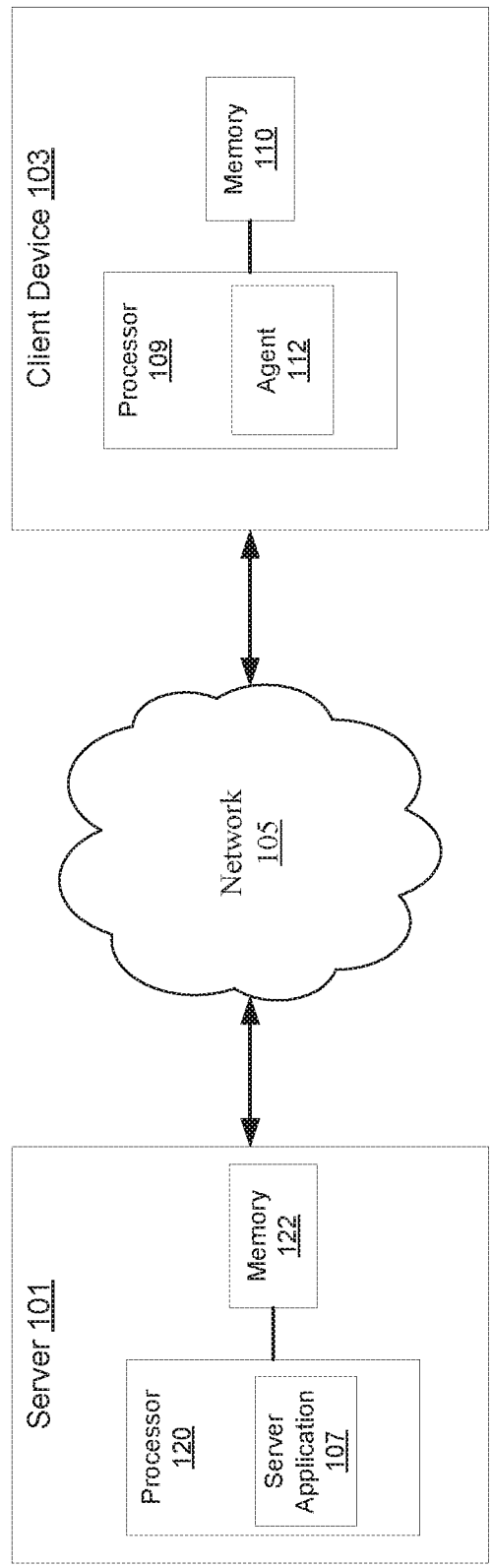
FIG. 1 is a system block diagram of a device authentication system, according to an embodiment.

Server applications, including web properties, websites, web applications, social media sites, video-sharing websites, and streaming services, regularly provide access to copyrighted or proprietary data to public, non-authenticated users. Examples of server applications that provide public, non-authenticated users with access to copyrighted or proprietary data include, for example, video-sharing sites, news and entertainment sites, apps, live and on-demand streaming video platforms, business applications for corporations, healthcare-related applications, Internet of Things (IoT) applications, autonomous vehicle applications (e.g., airplane applications, automobile applications, etc.), and/or the like.

Video-sharing sites, for example, can deliver media owned by third-party rights holders or the owner of the video-sharing site. Third-party rights holders can include, for example, a record label, a movie studio, a media company, a broadcaster, a game-maker company, a government or a government agency, an IoT service provider, a corporation that provides web-enabled services, and/or the like. Some news and entertainment sites can implement a form of a "paywall," in which a site provides access to a portion of copyrighted or proprietary data to a public, non-authenticated user, and more extensive access to copyrighted and proprietary data to a user after the user has logged into the site. Often, a server application can restrict the ability to successfully login to the site to users who have purchased a subscription to the site, or who have been otherwise granted access to the site.

In these examples where server applications provide public access to copyrighted or proprietary data, a user is able to access a public, non-password protected web page (for instance a landing page for a server application) from which the user is able to view, listen to, interact with or otherwise consume the copyrighted or proprietary data without logging into the server application with a username and a password (or without authenticating through another means, for example biometric authentication, or authentication via an integrated circuit, circuit or smart card).

Owners of server applications often seek to prevent piracy and unauthorized acquisition of the copyrighted or proprietary data that users are able to access from public non-password protected web or app pages served by the server application. Owners of the server applications that provide access of copyrighted data to public, non-authenticated users, as well as the rights holders of the data, may seek to prevent piracy or digital theft of the copyrighted data available to public users, because unauthorized retransmission of the copyrighted data provided to public users can result in damages to the rights holders of the copyrighted data. Potential damages to the owners of server applications (who often enter into license agreements with rights holders that include fees paid to the rights holders for use of the data on a server applications site or app) can also exist. When the rights holder of the data is a third-party, for example a studio, record label, publisher, game-maker company or another type of media company or rights holder of intellectual property, the damages can be severe.

In some examples, after a user of a server application has logged into the server application's site or app, the user can access an account page and other password-protected portions of the site or app, as well as a more extensive array of copyrighted and/or proprietary data than the access provided in the public, non-password protected portions of the site or app. Depending on the purpose of the site or app provided by the server application, account information often includes personal information (PI), including, but not limited to, for example, name; address; email address; password; phone number; social security number; date of birth; gender; name of spouse or next of kin; credit card number and other financial and billing-related information; personal health information (PHI); purchasing information; subscription billing information; and/or the like. In some instances, a portion of the data provided by a user to a server application for the user's account can be private or otherwise confidential data. Once logged into a site or an app served by a server application, a user can also, in some instances, perform actions specific to the user's account. For example, a user may be able to update, configure or otherwise modify the security settings for a user's use of a site or an app; or add, edit, delete or otherwise modify data on the user's account page, including, updating billing information, purchasing additional subscriptions or cancelling a subscription to the site or app provided by the server application. Once logged in to the site or app provided by the server application, in some instances a user can also update the user's profile, for example providing data on the user's work experience, educational background, relationship status or other profile-related information. In some instances, a user can upload or create user-generated content (UGC), such as video, audio, an image, game, eBook or another form of text; or post updates, or otherwise message fellow users of the server application. Once logged in, a user can also view, listen to or otherwise consume user-generated, confidential, private, copyrighted or proprietary data that the user would not be able to access and consume without first logging into the server application.

As users use more and more server applications, users face the challenge of effectively managing an ever-growing list of passwords for various server applications. As the use of server applications continues to increase, the personal information users provide to server applications is increasingly at risk of being breached, hacked, compromised or otherwise stolen. This risk is exacerbated by the fact that users often reuse the same password across multiple server applications, which makes a user's personal information vulnerable to a "hack once-hack everywhere" attack; it is also exacerbated by the fact that users often use weak passwords that are very easy to hack.

One reason users reuse passwords or use weak passwords to access server applications is convenience. Moreover, many users regard using password-manager software applications or other secure means for managing multiple passwords for server applications too cumbersome and time consuming to put into practice.

In some embodiments, the device authentication and data encryption systems and methods described in detail below can help prevent piracy and unauthorized acquisition of copyrighted or proprietary third-party data that server applications serve to users via public non-password protected web or app pages. In some embodiments, the device authentication and data encryption systems and methods described in detail below can provide users of server applications with the convenience of not having to login to a server application with a password to be authenticated. Thus, a user can, without using a password to login to the server application, receive, play, access, view, listen to, interact with or otherwise consume copyrighted, proprietary or third-party data served by the server application.

In one embodiment, for example, a user accesses a site or an app (e.g., client application) served by a server application for the first time from a particular client device. The client device downloads a client installation package or a software agent from the server. Included in the software agent or the client installation package installed on the client device is a utilization code, which is a unique identifier for the client device or a unique identifier for the software agent installed on the device. Each time a user accesses the server application from the device, the server application uses the utilization code to identify and authenticate the client device. Because the utilization code is provided by the server application and therefore known and/or stored by the server application, the server application (or a proxy of the server application, for example a web service) is able to identify and authenticate the device or the software agent provided by the server application and installed on the device, without requiring the user to login to the site or app served by the server application. Once the server application authenticates via the utilization code a client device or the software agent provided by the server application and installed on said client device, the server application determines that the client device or software agent is permitted to receive data served from the server application. When a user returns again to the site or app provided by the server application at a later date, the server application can attempt to obtain from the client device the utilization code for the client device or the utilization code for the software agent installed on the client device. Because the utilization code is a unique identifier for a specific device, or a unique identifier for the device on which the software agent is installed, the device or the software agent will fail authentication if the utilization code obtained by the server application from the client device or software agent does not match the utilization code known and/or stored by the server application.

As used herein, the singular forms "a," "an" and "the" include plural referents unless the context clearly dictates otherwise. Thus, for example, the term "a server application" is intended to mean a single server application or a combination of server applications. For another example, "a utilization code" is intended to mean a single utilization code or a combination of utilization codes.

As used herein, a module can be, for example, any assembly and/or set of operatively-coupled electrical components associated with performing a specific function, and can include, for example, a memory, a processor, electrical traces, optical connectors, software (executing in hardware) and/or the like.

As used herein, data can include, for example, information such as videos, audio, text, images, games, usernames, passwords, banking transaction information (e.g., credit card information, back account information, etc.), healthcare information (e.g., prescription information, healthcare records, etc.), public data, protected data, proprietary data, personal data, private data, user generated content, personal health data, Internet of Things (IoT) data, autonomous vehicle data (e.g., navigation data, status data, security data, etc.), and/or any other information.

FIG. 1 is a system block diagram illustrating a server 101 and a client device 103 communicating via a network 105, according to an embodiment. The server 101 can include a memory 122 and a processor 120 configured to execute a server application 107. The client device 103 can include a memory 110 and a processor 109 configured to execute an agent 112, as described in further detail herein.

In use, when a user accesses a website or an app served by a server application 107 for the first time from a client device 103, the server application 107 sends to the client device 103 (via network 105) a client installation package or a software agent 112. The client device 103 can then use the received file to install the agent 112. The agent 112, or the client installation package of the agent 112, includes a utilization code. The utilization code is a unique identifier for the client device 103, or, a unique identifier for the agent 112 installed on the client device 103. Each time a user accesses the server application 107 from the client device 103, the server application 107 uses the utilization code to identify and authenticate the client device 103. The server 101 can store the utilization code (also referred herein to as a "utilization identifier") that is uniquely associated with the software agent and/or client device (e.g., within memory 122).

As the utilization code is provided by the server application 107 and therefore stored at the server application 107 (e.g., within memory 122), the server application 107 can identify and authenticate the client device 103 or the agent 112 provided by the server application 107 and installed on the client device 103, without requiring a user to login to the website or app served by the server application 107. For example, the server 101 can store a representation of the utilization code (also referred herein to as a "utilization identifier") provided to each client device (including client device 103). When the client device 103 accesses the server 101 the server application, or a proxy of the server application (not shown in FIG. 1), makes a call (e.g., sends an authentication request) to the client device to attempt to obtain the utilization code for said device, or the agent 112 can provide the utilization code to the server 101. In some instances, the client device 103 or the software agent 112 can send to the server 101 an authentication response including the utilization code. The server application 107 can query a utilization code database (not shown in FIG. 1) stored in the memory 122 and can match the utilization code for the agent 112 with a utilization code stored in the memory 122 (also referred herein to as a "utilization identifier").

In one embodiment, after the server application 107 authenticates (using the utilization code) a client device 103 or the agent 112 provided by the server application 107 and installed on the client device 103), the server application 107 determines that the client device 103 or agent 112 is permitted to receive data served from the server application 107. After the client device 103 or the agent 112 is authenticated by the server application 107 via the utilization code, the user can receive, view, play, listen to or otherwise consume data served by the server application 107 from the authenticated device or agent.

In one embodiment, a server application 107 can serve its content and/or send data from a single physical machine, or from multiple physical machines; from a virtualized server, or from multiple virtualized servers; a geographically distributed network of operatively coupled servers, for example, a content delivery network (CDN); as well from a public or a private cloud.

In one embodiment, the user can download the client installation package or the agent 112 from a proxy of the server application 107 (for example a web service), rather than directly from the server application 107. In an embodiment, an Internet bot accesses the server application, rather than a user.

In one embodiment, the utilization code can be used to generate an encryption key for encrypted communication between the server 101 and the client device 103. In one implementation the utilization code is also a seed, or one value, input or variable in a set of values used to generate a seed. In another implementation the utilization code can include a seed, or be one value, input or variable in a set of values used to generate a seed. Similarly stated, the server 101 can generate an encryption key based on the seed, which is based at least in part on the utilization code. In such an implementation, the seed can be used to generate an encryption key that encrypts data sent from the server application 107 to the client device 103 (i.e., to generate encrypted data). The encryption key can also encrypt data sent from the client device 103 to the server application 107.

In some embodiments, the utilization code is a unique identifier for the client device 103. The encryption key generated from the seed can also be unique to the client device 103. In some implementations, the utilization code can be provided to only one client device 103 (or to one software agent 112 provided by the server application 107).

For example, the seed can be the utilization code itself and/or be generated based on the utilization code in combination with at least a portion of one or more values such as, for example, an IP address associated with the client device 103 and/or the server 101, a Media Access Control (MAC) address associated with the client device 103 and/or the server, a port number (e.g., a Transmission Control Protocol (TCP) port number) of the client device 103 via which the client device 103 accesses the server 101, a time value associated with the client device 103 accessing the server 101, a static or dynamic value stored at the memory 122, and/or any other suitable values. In some instances, such values can be combined to define a seed.

In some instances, the utilization code can be a unique identifier that is uniquely provided to one client device 103 and/or to one agent 112 provided by the server application 107. Therefore, when a user accesses a website, or an app, served by a server application 107, the server application 107 can automatically identify and authenticate the client device 103, provided that the server application 107 can obtain from the client device 103 the utilization code for the client device 103. If the utilization code obtained by the server application 107 from the client device 103 or the agent 112 does not match the utilization code stored by the server application 107, or if the server application is unable to obtain a utilization code from the client device or the agent installed on the client device, the client device 103 is determined to be unauthenticated and the access by the client device 103 is denied.

In some implementations, the agent 112 and utilization code are provided to the client device 103 when the client device 103 first accesses the server application 107 executing on the server 101 and without requiring the user of the client device to log-in to the site or app served by the server 101 by the client device 103. In other implementations, the agent 112 and utilization code are provided after the user of the client device 103 successfully authenticates with the server application 107 executing on the server 101 in another manner. In such implementations, for example, the agent 112 and/or the utilization code are provided to the client device 103 after a user of the client device 103 signs into and/or authenticates to an account with the server application 107 executing on the server 101 (e.g., using e.g., biometric authentication, geographic authentication, or authentication via an integrated circuit, circuit or smart card (e.g., using an IP address), username and password authentication, etc.). In some implementations, the utilization code can be used as a salt that hashes a user's password when the user logs into or otherwise signs into the server application's website or app.

In some situations, the client device 103 may not be successfully authenticated by the server application 107 if the utilization code cannot be obtained by the server application 107. If authentication of a client device 103 or a software agent 112 fails because the server application 107 is unable to obtain from the client device 103 the unique utilization code for that client device 103 or said software agent 112, or if the utilization code obtained by the server application 107 does not match the utilization code known by the server application 107, in such situations, the server application 107 can take any number of actions, including, but not limited to: (1) not permitting the server application 107 to send data to the client device 103 and/or the agent 112 that failed authentication; (2) de-activating, terminating or otherwise "locking out" the utilization code for a client device 103 or agent 112, such that, if the server application 107 subsequently obtains that utilization code from a client device 103 or an agent 112, then authentication of the client device 103 or agent 112 can fail when a user accesses from the client device 103 or the agent 112 the site or app served by the server application 107; (3) adding the client device 103 or the agent 112 to a list of untrusted devices (or untrusted instances of the agents), which can be monitored for abnormal and potentially malicious accesses to the server application 107 including, but not limited to, eavesdropping or packet sniffing data transmitted to and from the server application 107; and/or (4) providing a new utilization code for the client device 103 or the agent 112. Such a new utilization code can be distinct from the utilization code that the server application 107 was previously unable to obtain from the client device 103 or the agent 112. In other words, the new utilization code can be unique from the utilization code that previously resulted in the failed authentication.

In some implementations, each time a user downloads from the server application 107 a new client installation package (or a software update for the agent 112) to the client device 103 on which a utilization code was previously installed, the updated agent 112 or the new client installation package installed on the client device 103 can include a new utilization code. Therefore, the server application 107 can identify and authenticate the client device 103 and/or the agent 112 without requiring the user to login to the website or app served by the server application 107.

In some embodiments, when a user, who owns or leases a client device for which the server application 107 has provided a utilization code for the client device 103 or a utilization code for the agent 112 installed on the client device 103, loses the client device, the user can communicate to the owner of the server application 107 (e.g., through a phone call, text message, message sent via the Internet or message sent through physical mail) regarding the loss. The server application 107 can take any number of actions, including, but not limited to: (1) not sending data to the lost client device or the agent installed on that lost client device; (2) de-activating, terminating or otherwise "locking out" the utilization code for the lost client device or the agent on the lost client device, such that authentication of the lost client device fails when a user accesses a website or an app that is served by the server application 107; and/or (3) adding an identifier of the lost client device or the agent installed on the lost client device to a list of untrusted devices, which can be monitored for abnormal and potentially malicious accesses to the server application 107 including, but not limited to, eavesdropping or packet sniffing data transmitted to and from the server application.

In other instances, when the user of the lost client device finds or otherwise reclaims a lost client device, the server application 107 can provide a new utilization code for the client device 103 that was previously lost, or a new utilization code for the agent 112 installed on the device that was previously lost. The new utilization code can be different from or the same as the utilization code that the server application 107 previously deactivated when the server application 107 received a communication that the client device 103 had been lost.

In some instances, when a user accesses a website or an app served by a server application 107 for the first time from a client device 103, the user can download from the server application 107 multiple agents 112. Each agent from the multiple agents can include a unique utilization code. In other words, each software agent from the set of software agents has a utilization code unique to that software agent. Thus, multiple unique utilization codes can be installed on the client device 103 at that first time. Each time a user accesses the site or an app served by a server application 107 from the client device 103 on which multiple unique utilization codes from the server application 107 have been installed, the server application 107 can use the multiple unique utilization codes to identify and authenticate the client device 103. Because the multiple unique utilization codes are unique identifiers associated with a specific device, as well as unique identifiers for each of the individual software agents in the set of software agents downloaded from the server application and installed on the device, the client device 103 can fail the authentication if one or more of the unique utilization codes for the individual software agents in the set of utilization codes obtained by the server application 107 from the agents 112 installed on device does not match the utilization code stored at the server application 107. In an embodiment, there are multiple unique utilization codes in a single software agent. Each time a user accesses the site or an app served by a server application 107 from the client device 103 on which a software agent (e.g. the agent that includes multiple unique utilization codes) from the server application have been installed on the client device, the server application 107 can use the multiple unique utilization codes to identify and authenticate the client device 103.

The server application 107 can use the utilization code to identify and authenticate the client device 103 or the agent 112 prior to sending data to the client device 103 or the agent 112. In some implementations, however, the user of the client device 103 may not be able to access personal information (PI), and perform actions specific to the user's account, for example, submit user-generated content (UGC) without first logging into the server application's website or app via username and password authentication or another means (e.g., biometric authentication, geographic authentication, authentication via an integrated circuit, circuit or smart card (e.g., using an IP address), etc.).

In such implementations, the user may be able to access personal information (PI), and perform actions specific to the user's account when (1) the client device 103 or the agent 112 has been successfully authenticated by the server application 107 via the utilization code, and (2) the user has logged into the website or app provided by the server application 107 in a manner that satisfies the owner of the server application's process or standard for validating the identity of a user.

In another embodiment, once the client device 103, the agent 112 or the agents provided by the server application 107 and installed on the client device 103 has been successfully authenticated by the server application 107 via a utilization code or codes, the user of the client device 103 can update, configure or otherwise modify the security settings for the user's use of a website or an app served by the server application 107.

For example, the user can configure the security settings such that the user can access the user's personal information (PI), perform actions specific to the user's account, for example, submitting user-generated content (UGC) after the user has logged into or otherwise signed into the website or app provided by the server application 107.

For another example of a security setting, the user can have the option to select a predetermined period of time since the user's last successful login, before the user can be asked to log into or otherwise sign into the website or app to access the user's personal information (PI), and perform actions specific to the user's account. Yet another security setting can allow a user to select which personal information or actions specific to the user's account the user would or would not be able to view, modify or perform without first logging into or otherwise signing into the website or app provided by the server application. The user can also set security settings for the website or app provided by the server application such that the user can only be required to log into or otherwise sign into the website or app provided by the server application one time from the device for the user to access the user's personal information (PI), and perform actions specific to the user's account, for example, submitting user-generated content (UGC).

In an embodiment, when the user, who has previously accessed a website or an app served by a server application from a client device or an agent installed on the client device (i.e., the original device), accesses for the first time the website or the app served by the server application from a client device that is not the original client device (i.e., a subsequent client device), the user can request and then download from the server application to the user's subsequent client device a client installation package or a different instance of the software agent than the instance of the software agent installed on the original device.

The agent, or the client installation package installed on that subsequent client device can include a utilization code. The utilization code is a unique identifier for the subsequent client device or the agent installed on the subsequent client device. Each time a user accesses the server application from the subsequent device, the server application can use the utilization code to identify and authenticate the subsequent client device.

If (1) the server application authenticates via the utilization code the original client device or the software agent provided by the server application and installed on the original client device, and (2) a user has logged into the website or app provided by the server application from the original client device via username and password authentication or another method (e.g., geographic authentication (e.g., using an IP address), biometric authentication, authentication via an integrated circuit, circuit or smart card etc.) in a manner that satisfies the owner of the server application's process or standard for validating the identification of the user accessing from the authenticated original client device (or from the agent installed on the original device) and if (1) the server application authenticates via the utilization code the subsequent client device or the software agent provided by the server application and installed on the sequent client device and (2) a user has logged into the website or app provided by the server application from the subsequent client device via username and password authentication or another method (e.g., geographic authentication (e.g., using an IP address), biometric authentication, or authentication via an integrated circuit, circuit or smart card etc.) in a manner that satisfies the owner of the server application's process or standard for validating the identification of the user accessing from the authenticated subsequent client device (or from the agent installed on the subsequent device)), the server application 107 can associate, correlate or otherwise link the utilization code for the original client device, or the utilization code for the original agent or agents installed on the original device, with the utilization code for the subsequent client device, or the utilization code for the agent or agents installed on the subsequent device (e.g., by storing an association in memory 122). In addition to the server application's awareness of the utilization code for the original client device, or the utilization code for the original agent or agents installed on the original device, being associated with the utilization code for the subsequent client device, or the utilization code for the agent or agents installed on the subsequent device, the server application also associates the original client device and/or the original agent or agents and the subsequent client device and/or the subsequent agent or agents with a specific user.

In some instances, the agent provided by the server application 107 can be a web browser, a plug-in to a web browser or a native application, a native app for iOS, Android or Windows mobile devices, streaming media players, monitoring services, web browsers, an email application or client, applets, plugins, an agent configured solely to store and/or process the utilization code such that it can be obtained by the server application, and/or the like. If a user logs into the account login page for the agent, i.e., the web browser, or otherwise signs into the web browser in another manner that fulfills, meets or otherwise satisfies the owner of the server application's process or standard for validating the identify of a user, the user is logged into not only the user's account for the web browser, but also to other websites or apps for which the web browser is integrated with for single sign-on (SSO).

In some situations, a client device 103 or an agent 112 provided by the server application and installed on the client device can re-install or update the agent once a time period that is predetermined by the server application 107 has elapsed. The re-installing or updating of the agent can automatically generate a new utilization code for the client device 103. If the user of the client device 103 does not re-install or update the agent 112 once the predetermined period of time has elapsed, the client device 103 or the agent 112 may not be permitted to access the server application 107, nor will the server application 107 send data to or receive data from the client device 103, or otherwise communicate with the client device 103, with the exception of prompting or notifying the client device 103 that re-installing or updating of the agent 112 is required to continue use of the server application 107.

While shown and described above as an interaction between a server 101 and a client device 103, in some implementations the client device 103 can be in peer-to-peer communication with a second client device instead of or in addition to a server 101. For example, the second client device can function similar to server 101 and can be structurally similar to the client device 103. Similar to the server 101, the second client device can be configured to send data associated with an agent and a utilization code to the client device 103 upon receiving a request for data from the client device 103. Authentication between the client devices can be accomplished based on the utilization codes associated with agents on the client devices. Similarly, in some instances, encryption of data sent between the client devices can be based on the utilization codes associated with the agents on the client devices.

Figure 2:
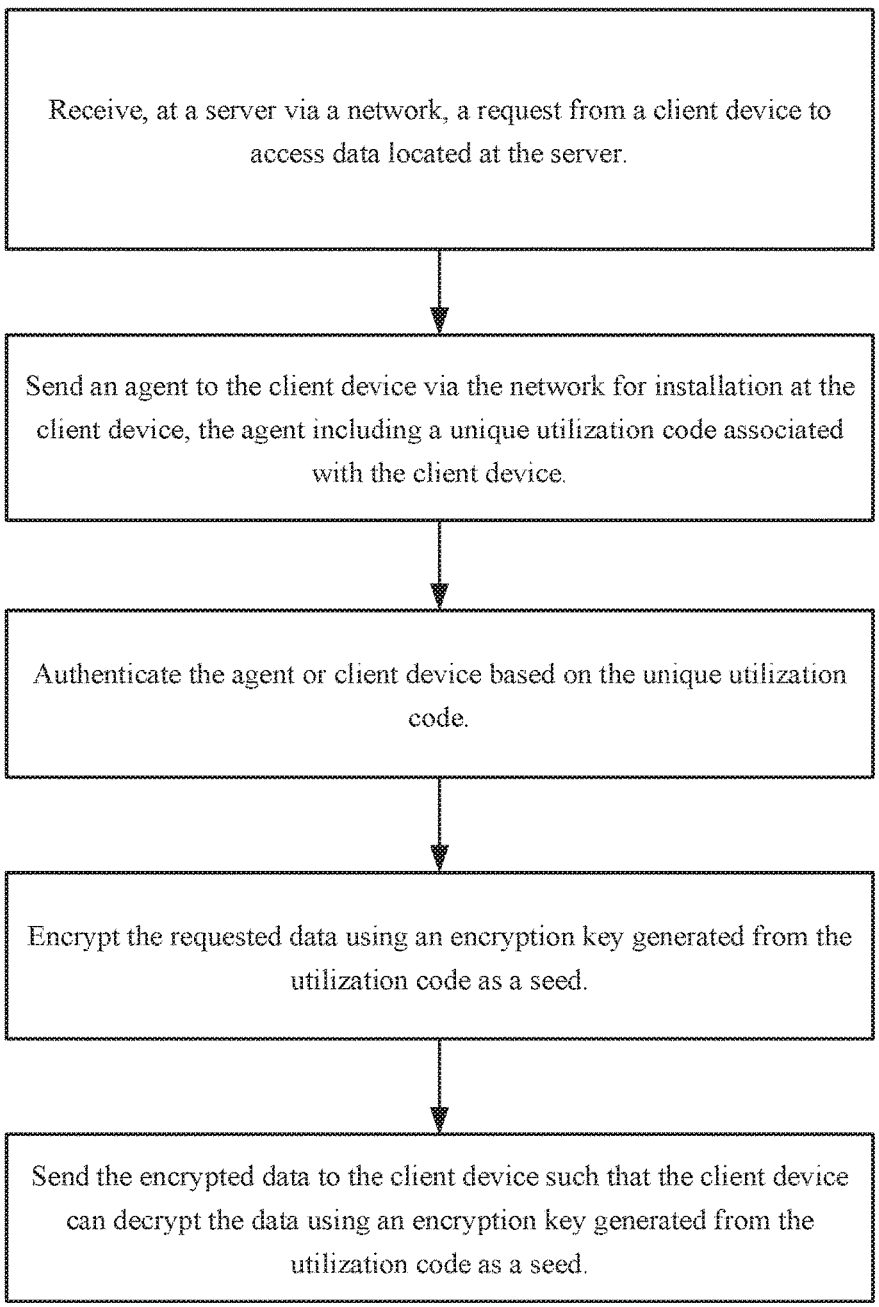
FIG. 2 is a flow chart illustrating a device authentication and data encryption method, according to an embodiment.

FIG. 2 is a flow chart illustrating a device authentication and data encryption method 200, according to an embodiment. The device authentication and data encryption method 200 can be executed at, for example, a processor at a server such as the processor 120 of the server 101 shown and described with respect to FIG. 1. The server can include, for example, a processor and a memory operatively coupled to the memory. The processor can include, for example, a server application such as the server application 107 shown and described with respect to FIG. 1. Furthermore, the server can be operatively coupled to a network that is similar to the network 105 shown and described with respect to FIG. 1, and in communication with a client device such as the client device 103 shown and described with respect to FIG. 1.

At 202, the processor at the server receives a request for the first time from a particular client device to access data located at the memory of the server (or other device associated with the server). The server sends a client installation package or an agent to the client device, at 204, for installation at the client device. The server application, or a proxy of the server application (not shown in FIG. 1), makes a call (e.g., sends an authentication request) to the client device to attempt to obtain the utilization code for the client device, or the agent 112 can provide the utilization code to the server 101. In some instances, the client device sends to the server an authentication response including the utilization code.

The server determines if the utilization code obtained or received from the client device substantially matches the utilization code (also referred herein to as a "utilization identifier") provided by the server. If the utilization codes match, the client device is authenticated and approved for further data transmission, at 206. Similarly stated, the server application utilizes the utilization code to authenticate and identify the device. In some embodiments, if the server application is unable to obtain or does not receive a utilization code from the client device (e.g., the utilization code on the client device has been erased, tampered with and/or manipulated, etc.), the server can provide a new utilization code for the device or software agent. The new utilization code can be unique from the utilization code that the server application was previously unable to obtain from the device or the software agent; namely, the new utilization code can be unique from the utilization code which previously resulted in the failed authentication.

At 208, the server can encrypt the data requested by the client device (or agent installed on that client device) to generate encrypted data by using the utilization code as a seed, or as one input, value or variable of multiple inputs, values and variables used to generate a seed, that generates an encryption key, and sends the encrypted data, at 210, to the client device. Upon receiving the encrypted data, the client device uses the encryption key generated from the seed (e.g., stored locally in a memory, stored at a network accessible memory, stored at the agent, and/or the like) to decrypt the data. In some embodiments, the utilization code can be used as a seed, or as one input, value or variable of multiple inputs, values and variables used to generate a seed. The seed can be used to generate an encryption key that encrypts data sent from the server to the client device. The encryption key can also be used to encrypt data sent from the client device to the server. The server sends the encrypted data to the client device without requiring a user of the client device to login when the utilization code matches the utilization identifier stored in the database in the memory.

FIG. 3 is a logical representation of data exchange between a server, a client device, and an agent on the client device, according to an embodiment. The server 302, the client 304, and the agent 306 can be structurally and functionally similar to the server 101, the client device 103, and the agent 112, respectively, described with respect to FIG. 1. Initially, when the client 304 accesses the server 302 for a first time at 310, the server 302 sends an agent (or a client installation package for installing the software agent on the client device) to the client device for installation at 312. The agent 112 can include, but is not limited to native apps for iOS, Android or Windows mobile devices, streaming media players, monitoring services, web browsers, an email application or client, applets, plugins, plugins to interne browsers, plugins to native apps, an agent configured solely to store and/or process the utilization code such that it can be obtained by the server application and/or other clients installed on a device. The utilization code is uniquely associated with the client device 304. The client device installs the agent 306 (e.g., stored in memory and executed using the processor of the client device at 314). At 316, the agent 306 can further send a request to access data at the server 302. The requested data can be associated with a server application or server applications deployed/running on or accessible by the server. Examples of server applications include, but are not limited to, websites, web applications, social media websites, video-sharing websites, and/or streaming services, any one of which can regularly provide access to copyrighted, personal, private, and/or proprietary data to public and/or non-authenticated users. In response to the request for data, the server 302 or a proxy of the server application (not shown in FIG. 1), can fetch (e.g., make a call or send an authorization request to retrieve or obtain) a utilization code from the agent 306, at 317. After the server 302 or a proxy of the server application (not shown in FIG. 1), receives and/or obtains the utilization code from the agent 306, the server 302 determines if the client device 304 is authenticated based on the utilization code by verifying if the utilization code obtained from the agent 306 matches the utilization identifier stored in a database at the server 302, at 318. If authenticated, the server 302 can optionally encrypt the requested data using the utilization code as a seed for an encryption key and send the encrypted data to the client device 304 or the agent 306. In response to receiving the encrypted data, the agent 306 decrypts the encrypted data using, as a seed to an encryption key, the utilization code installed on the client device or accessible to the client device. The agent 306 and/or client 304 can then present the decrypted data to the user. While described in FIG. 3 as fetching the utilization code from the agent 306, in other embodiments, the server 302 can receive the utilization code from the agent with the request for data at 316.

While described above as storing and/or providing a utilization code uniquely associated with a client device, in other instances the agent can instead use identifiers and/or characteristics associated with the client device and/or the server to derive the utilization code. Such factors can include, for example, an IP address of the server, an IP address of the client device, a TCP port of the client device used to access the server, a MAC address associated with the client device, and/or any other identifier associated with the client device and/or the server. Such characteristics and/or identifiers can be combined (e.g., by the agent) to derive a utilization code.

In other scenarios, instead of or in addition to a user device accessing a site or an app served by a server application an Internet bot can be used to access the site or the app. In such scenarios, the Internet bot would download the agent from the server application and be provided a utilization code similar to a user device, described above. Moreover, while described above as using the utilization code as a seed to calculate and/or derive an encryption key, in other instances the utilization code can be used as the encryption key.

Referring back to FIG. 1, the server 101 and/or the client device 103 can be or include a computer, a cell phone, a tablet, an electronic device, a digital media player, a microconsole, a set-top-box, a smart TV, a critical embedded systems, coprocessors, field-programmable gate arrays (FPGAs) and/or the like. The server 101 can include at least one processor 120 and at least one memory 122. The at least one processor 120 and the at least one memory 122 are operatively coupled with each other. The at least one memory 122 can be, for example, non-volatile memory, volatile memory, memory local to a server or networked, virtualized memory, a random-access memory (RAM) (e.g., a dynamic RAM, a static RAM), a flash memory, a removable memory, and/or so forth. In some embodiments, the memory 122 can store, for example, a database, process, application, virtual machine, and/or other software modules (stored and/or executing in hardware) or hardware modules configured to execute a device authentication process, one or more associated methods for authenticating a device (e.g., via a communications interface (not shown in FIG. 1)), an encryption process, and/or any other server process. In such implementations, instructions for executing the device authentication process, the encryption process, and/or any associated methods can be stored within the memory 122 and executed at the processor 120.

The at least one processor 120 can be any hardware module and/or component configured to receive and process data, and/or to execute code representing instructions. In some embodiments, the at least one processor 120 can be a general purpose processor, a Field Programmable Gate Array (FPGA), an Application Specific Integrated Circuit (ASIC), a Digital Signal Processor (DSP), and/or the like. The at least one processor 120 can implement a number of modules and/or server components, including but not limited to a server application 107. The at least one processor 120 can be configured to execute instructions generated by any of the modules and/or server components, and/or instructions stored in the memory 122. In some implementations, if the server 101 includes multiple processors 120, the modules and/or server components can be distributed among and/or executed by the multiple processors. The at least one memory 122 can be configured to store processor-readable instructions that are accessible and executable by the processor 120.

In some implementations, the server application 107 can be implemented on the processor 120 (e.g., as software executed on and/or implemented by the processor). In some implementations, the server application 107 can be software stored in the memory 122 and executed by the processor 120. In other implementations, the server application 107 can be any assembly and/or set of operatively-coupled electrical components separate from the processor 120 and the memory 122, including but not limited to field programmable gate arrays (FPGAs) and/or application-specific integrated circuits (ASICs). The server application 107 can include, but not limited to web properties, websites, web applications, social media websites, video-sharing websites, streaming services, and/or the like.

The network 105 can be any network or combination of networks capable of transmitting communication information (e.g., data and/or signals) and can include, for example, a telephone network, an Ethernet network, a fiber-optic network, a wireless network, a cellular network and/or the like. The communication information can be transmitted over a wireless network, such as, for example, a Wi-Fi® or wireless local area network ("WLAN") connection, a wireless wide area network ("WWAN") connection, a cellular connection and/or the like. A network connection can be a wired connection such as, for example, an Ethernet connection, a digital subscription line ("DSL") connection, a broadband coaxial connection, and/or a fiber-optic connection and/or the like.

The client device 103 can be or include a computer, a cell phone, a tablet, an electronic device, a critical embedded systems, coprocessors, and field-programmable gate arrays (FPGAs), a set-top-box, a smart TV, a digital media player, a microconsole, a VGA, DVI, DisplayPort or HDMI-compliant device and/or another type of network-enabled machine. The client device 103 can include a processor 109 and a memory 110. The processor 109 and the memory 110 are operatively coupled with each other and are structurally and functionally similar to the processor 120 and the memory 122 of the server 101, respectively. The memory 110 can be, for example, a random-access memory (RAM) (e.g., a dynamic RAM, a static RAM), a flash memory, a removable memory, and/or so forth. In some embodiments, the memory 110 can include, for example, a database, process, application, virtual machine, and/or some other software modules (stored and/or executing in hardware) or hardware modules.

In some implementations, the client device 103 can be any other network-connected device. For example, the client device 103 can include an IoT device, an automobile, an airplane, a connected medical device (e.g., heartrate monitor, blood pressure monitor, etc.), a smart home device (e.g., thermostat, lighting, security system, etc.), and/or the like.

The processor 109 can be any hardware module and/or component configured to receive and process data, and/or to execute code representing instructions. In some embodiments, the processor 109 can be a general purpose processor, a Field Programmable Gate Array (FPGA), an Application Specific Integrated Circuit (ASIC), a Digital Signal Processor (DSP), and/or the like. The processor 109 can implement a number of modules, including but not limited to an agent 112. The processor 109 can be configured to execute instructions generated by any of the modules and/or server components, and/or instructions stored in the memory 110.

In some implementations, the agent 112 can be implemented on the processor 109 (e.g., as software executed on and/or implemented by the processor). In some implementations, the agent 112 can be software stored in the memory 110 and executed by the processor 109. The agent 112 can include, but is not limited to native apps for iOS, Android or Windows mobile devices, streaming media players, monitoring services, web browsers, an email application or client, applets, plugins, plugins to interne browsers, plugins to native apps, and/or other clients installed on a device. In some instances, the agent 112 can be solely used to provide a utilization code to the client device 103 for authenticating the client device 103 for use of the server application running/deployed on the server 101 (e.g., without user interaction). In other instances, the agent 112 can include other functionality such as encrypting and/or decrypting data using a key, which is generated using the utilization code as a seed, or as one value, input or variable in a set of values used to generate a seed, and sent to and/or received from the server 101, displaying and/or presenting media, and/or the like. In some instances, the agent 112 can be software configured to execute on an Internet of Things (IoT) device In some embodiments, using the utilization code, the server 101 can then track activity of each particular user (e.g., what data is accessed, what Internet Protocol (IP) addresses are used to access the server by the client device 103, geographic locations from which the client device 103 accesses the server 101 (e.g., using IP addresses), the frequency with which the client device 103 accesses the server 101, etc.). In some embodiments, when multiple agents are installed on the client device 103, the multiple agents can share the same utilization code associated with the client device 103. In other implementations, the utilization code can be unique to each agent 112. In such implementations, when multiple agents are installed on the client device 103, each agent 112 has its own unique utilization code. In another embodiment, in addition, each agent 112 can separately authenticate with the server 101 using its utilization code (e.g., the client device 103 is authenticated once each agent 112 is authenticated), the agents 112 can combine utilization codes to produce a combined and/or composite utilization code used to authenticate the client device 103, and/or the like.

While described above as the client device 103 downloading the agent 112 from the server 101, in other instances, the agent can be received by the client device 103 in any other suitable manner. For example, the client device 103 can download the agent 112 from another device via the network. For another example, the client device 103 can install the agent 112 from a compact disk (CD), universal serial bus (USB) device and/or another suitable device.

In some embodiments, a non-transitory processor-readable medium stores code representing instructions to be executed by a processor. The code includes code to cause the processor to send an authentication request to a client device to obtain a utilization code in response to a request from the client device to access data. The utilization code is uniquely associated with the client device. The code further includes code to cause the processor to receive and/or obtain (e.g., as a result of the processor contacting the client device, as a result of the processor fetching the utilization code from memory of the client device, as a result of the client device sending the utilization code to the processor, and/or the like) an authentication response including the utilization code from the client device and to cause the processor to authenticate the client device if the utilization code matches a utilization identifier stored in a database. In other instances, the processor can attempt to obtain the utilization code from the client device in any other suitable manner. The code includes code to cause the processor to generate an encryption key using a seed based at least in part on the utilization code and encrypt the data with the encryption key to generate encrypted data. The code further includes code to cause the processor to send, when the utilization code matches the utilization identifier stored in the database, the encrypted data to the client device without requiring a user of the client device to login.

In some implementations, the utilization code is uniquely associated with a software agent from a set of software agents on the client device. In such implementations, each software agent from the set of software agents can have a utilization code unique to that software agent.

In some implementations, the code further includes code to cause the processor to send, prior to sending the authentication request, a software agent or a client installation package for installing the software agent on the client device such that the client device installs the software agent and stores the utilization code uniquely associated with the client device from the software agent. In some implementations, the seed can be generated based on one or more unique identifiers associated with the client device instead of or in addition to being based on the utilization code. For example, in some implementations, the seed can be generated based on at least a portion of an internet protocol (IP) address associated with the client device, at least a portion of a Media Access Control (MAC) address associated with the client device, at least a portion of a port number of the client device via which the request is received from the client device, or a time value at which the request is received from the client device.

In some embodiments, an apparatus includes a memory and a processor operatively coupled to the memory. The processor is configured to send, at a first time, a software agent or a client installation package for installing the software agent on a client device such that the client device installs the software agent and stores a utilization code uniquely associated with the software agent or the client device. The processor is configured to receive, from the client device that is separate from the apparatus, a request to access data. At a second time after the first time, the processor is configured to send an authentication request to the client device to obtain the utilization code. The processor is configured to receive and/or obtain, from the client device, an authentication response including the utilization code (e.g., as a result of the processor contacting the client device, as a result of the processor fetching the utilization code from memory of the client device, as a result of the client device sending the utilization code to the processor, and/or the like) and authenticate the client device if the utilization code matches a utilization identifier stored in the memory. In other instances, the processor can attempt to obtain the utilization code from the client device in any other suitable manner. The processor is configured to send the data to the client device without requiring a user of the client device to login when the utilization code matches the utilization identifier stored in the memory.

In some implementations, the processor is configured to generate an encryption key based on a seed, which is based at least in part on the utilization code. The processor is configured to encrypt the data with the encryption key to generate encrypted data and send the encrypted data to the client device when the utilization code matches the utilization identifier stored in the memory.

In some implementations, the seed can be generated based one or more unique identifiers associated with the client device instead of or in addition to being based on the utilization code. For example, in some implementations, the seed can be generated based on at least a portion of an internet protocol (IP) address associated with the client device, at least a portion of a Media Access Control (MAC) address associated with the client device, at least a portion of a port number of the client device via which the request is received from the client device, or a time value at which the request is received from the client device. In some implementations, the client device includes a set of software agents including the software agent. Each software agent from the set of software agents is uniquely associated with a unique utilization code from a set of utilization codes.

In some implementations, the processor is configured to initiate a remedying action when the utilization code does not match the utilization identifier stored in the memory. The remedying action includes at least one of (1) not sending the data to the client device; (2) deactivating the utilization code to stop further authentications using the utilization code; (3) adding the software agent to a list of untrusted software agents to be monitored for abnormal access; or (4) providing a new utilization code different from the utilization code to the software agent.

In some implementations, the software agent is a web browser, a plug-in to a web browser, a streaming media player, a monitoring service, an email application, a native application, or an application specifically configured to store and process the utilization code. In some implementations, the processor is configured to send an updated software agent to the client device after a pre-determined period of time. The updated software agent includes an updated utilization code uniquely associated with the updated software agent. In some implementations, at least a portion of the data is served from one of a single physical machine, multiple physical machines, a virtualized server, multiple virtualized servers, a public cloud, a private cloud, or a geographically distributed network of operatively coupled servers.

In some embodiments, a method includes sending, at a first time, a software agent or a client installation package for installing the software agent on a client device. In response to receiving the software agent, the client device installs the software agent and stores a utilization code uniquely associated with the software agent. In some embodiments, the software agent is from a set of software agents at the client device and each has a unique utilization code. The method further includes receiving, from the client device, a request to access data (or private data or personal data) and sending, in response to the request and at a second time after the first time, an authentication request to the client device to obtain the utilization code that is uniquely associated with the software agent from the set of software agents. The method includes receiving and/or obtaining, in response to the authentication request, an authentication response including the utilization code (e.g., as a result of the processor contacting the client device, as a result of the processor fetching the utilization code from memory of the client device, as a result of the client device sending the utilization code to the processor, and/or the like) and determining if the utilization code matches a utilization identifier stored in a database. The method further includes sending, when the utilization code matches the utilization identifier stored in the database, the data to the software agent of the client device without requiring a user of the client device to login.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Objective-C Java™, Ruby, SQL, SAS®, the R programming language/software environment, Visual Basic™, and other object-oriented, procedural, scripted, machine language or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. A non-transitory processor-readable medium storing code representing instructions to be executed by a processor, the code comprising code to cause the processor to:

send an authentication request to a client device to obtain a utilization code in response to a request from the client device to access data, the utilization code uniquely associated with the client device;

obtain an authentication response including the utilization code from the client device;

authenticate the client device if the utilization code matches a utilization identifier stored in a database;

generate an encryption key using a seed based at least in part on the utilization code;

encrypt the data with the encryption key to generate encrypted data; and send, when the utilization code matches the utilization identifier stored in the database, the encrypted data to the client device without requiring a user of the client device to login.

2. The non-transitory processor-readable medium of claim 1, wherein the utilization code is uniquely associated with a software agent from a plurality of software agents on the client device, each software agent from the plurality of software agents having a utilization code unique to that software agent.

3. The non-transitory processor-readable medium of claim 1, further comprising code to cause the processor to send, prior to sending the authentication request, a software agent or a client installation package for installing the software agent on the client device such that the client device installs the software agent and stores the utilization code uniquely associated with the client device from the software agent.

4. The non-transitory processor-readable medium of claim 1, wherein the seed is generated based on at least a portion of a unique identifier associated with the client device.

5. The non-transitory processor-readable medium of claim 1, wherein the seed is generated based on at least a portion of an internet protocol (IP) address associated with the client device, at least a portion of a Media Access Control (MAC) address associated with the client device, at least a portion of a port number of the client device via which the request is received from the client device, or a time value at which the request is received from the client device.

6. An apparatus, comprising:

a memory; and a processor operatively coupled to the memory, the processor configured to:

send, at a first time, a software agent or a client installation package for installing the software agent on a client device such that the client device installs the software agent and stores a utilization code uniquely associated with the software agent;

receive, from the client device that is separate from the apparatus, a request to access data;

send, at a second time after the first time, an authentication request to the client device to obtain the utilization code;

obtain, from the client device, an authentication response including the utilization code;

authenticate the client device if the utilization code matches a utilization identifier stored in the memory; and send, when the utilization code matches the utilization identifier stored in the memory, the data to the client device without requiring a user of the client device to login.

7. The apparatus of claim 6, wherein the processor is configured to:

generate an encryption key based on a seed, the seed based at least in part on the utilization code, encrypt the data with the encryption key to generate encrypted data, the sending the data to the client device includes sending the encrypted data to the client device when the utilization code matches the utilization identifier stored in the memory.

8. The apparatus of claim 7, wherein the seed is generated based on at least a portion of a unique identifier associated with the client device.

9. The apparatus of claim 7, wherein the seed is generated based on at least a portion of an internet protocol (IP) address associated with the client device, at least a portion of a Media Access Control (MAC) address associated with the client device, at least a portion of a port number of the client device via which the request is received from the client device, or a time value at which the request is received from the client device.

10. The apparatus of claim 6, wherein the client device includes a plurality of software agents including the software agent, each software agent from the plurality of software agents uniquely associated with a unique utilization code from a plurality of utilization codes.

11. The apparatus of claim 6, wherein the processor is configured to initiate a remedying action when the utilization code does not match the utilization identifier stored in the memory, the remedying action including at least one of (1) not sending the data to the client device; (2) deactivating the utilization code to stop further authentications using the utilization code; (3) adding the software agent to a list of untrusted software agents to be monitored for abnormal access; or (4) providing a new utilization code different from the utilization code to the software agent.

12. The apparatus of claim 6, wherein the software agent is a web browser, a plug-in to a web browser, a streaming media player, a monitoring service, an email application, a native application, software configured to execute on an Internet of Things (IoT) device or an application specifically configured to store and process the utilization code.

13. The apparatus of claim 6, wherein the processor is configured to send an updated software agent to the client device after a pre-determined period of time, the updated software agent including an updated utilization code uniquely associated with the updated software agent.

14. The apparatus of claim 6, wherein at least a portion of the data is served from one of a single physical machine, multiple physical machines, a virtualized server, multiple virtualized servers, a public cloud, a private cloud, or a geographically distributed network of operatively coupled servers.

15. A method, comprising:

sending, at a first time, a software agent or a client installation package for installing the software agent on a client device such that the client device installs the software agent and stores a utilization code uniquely associated with the software agent, the software agent being from a plurality of software agents at the client device each having a unique utilization code;

receiving, from the client device, a request to access data;

sending, in response to the request and at a second time after the first time, an authentication request to the client device to obtain the utilization code that is uniquely associated with the software agent from the plurality of software agents;

obtaining, in response to the authentication request, an authentication response including the utilization code;

determining if the utilization code matches a utilization identifier stored in a database; and sending, when the utilization code matches the utilization identifier stored in the database, the data to the software agent of the client device without requiring a user of the client device to login.

16. The method of claim 15, wherein at least a portion of the data is served from one of a single physical machine, multiple physical machines, a virtualized server, multiple virtualized servers, a public cloud, a private cloud, or a geographically distributed network of operatively coupled servers.

17. The method of claim 15, further comprising:

generating an encryption key based on a seed, the seed based at least in part on the utilization code; and encrypting the data with the encryption key to generate encrypted data, the sending the data to the software agent includes sending the encrypted data to the client device when the utilization code matches the utilization identifier stored in the database.

18. The method of claim 15, further comprising:

initiating a remedying action when the utilization code does not match the utilization identifier stored in the database, the remedying action including at least one of (1) not sending the data to the client device; (2) deactivating the utilization code to stop further authentications using the utilization code; (3) adding the software agent to a list of untrusted software agents to be monitored for abnormal accesses; or (4) providing a new utilization code different from the utilization code to the software agent.

19. The method of claim 15, wherein the data is copyrighted data, confidential data, private data, or user-generated data.

20. The method of claim 15, wherein the software agent is a web browser, a plug-in to a web browser, a streaming media player, a monitoring service, an email application, a native application, or an application specifically configured to store and process the utilization code.

21. The method of claim 15, further comprising:

sending an updated software agent to the client device after a predetermined period of time to replace the software agent, the updated software agent including an updated utilization code uniquely associated with the updated software agent.

22. The method of claim 15, wherein:

the sending the authentication request includes sending the authentication request to the client device to obtain a utilization code uniquely associated with each software agent from the plurality of software agents;

the obtaining includes obtaining the authentication response including the utilization code associated each software agent from the plurality of software agents; and the sending the data includes sending the data to the client device when the utilization code associated with each software agent from the plurality of software agents matches a utilization identifier associated with that software agent.

* * * * *

UNITED STATES PATENT AND TRADEMARK OFFICE
CERTIFICATE OF CORRECTION

PATENT NO. : 9,996,679 B2
APPLICATION NO. : 15/586004
DATED : June 12, 2018
INVENTOR(S) : Paul A. Kline et al.

Page 1 of 1

It is certified that error appears in the above-identified patent and that said Letters Patent is hereby corrected as shown below:

Column 12, Line 31:
"interne browsers, plugins to native apps, an agent configured" should be -- internet browsers, plugins to native apps, an agent configured --

Column 15, Line 9:
"applets, plugins, plugins to interne browsers, plugins to" should be -- applets, plugins, plugins to internet browsers, plugins to --

Signed and Sealed this
Twenty-eighth Day of August, 2018

Andrei Iancu
*Director of the United States Patent and Trademark Office*